United States Patent
Mooring

(10) Patent No.: US 7,157,805 B2
(45) Date of Patent: Jan. 2, 2007

(54) WIND POWERED PENDULATING LAND SAIL ELECTRICITY GENERATION SYSTEM

(76) Inventor: Jon Mooring, 10790 Lawson Valley Rd., Jamul, CA (US) 91935

(*) Notice: Subject to any disclaimer, the term of this patent is extended or adjusted under 35 U.S.C. 154(b) by 0 days.

(21) Appl. No.: 10/997,543

(22) Filed: Nov. 24, 2004

(65) Prior Publication Data
US 2006/0152013 A1 Jul. 13, 2006

(51) Int. Cl.
*F03D 9/00* (2006.01)
*H02P 9/04* (2006.01)
(52) U.S. Cl. ............................. 290/55; 290/44
(58) Field of Classification Search ................ 290/55, 290/44, 43, 54; 415/907, 4.2, 7, 2.1; 416/8, 416/120, 15, 16, 14, 1, 119; 104/24; 417/331
See application file for complete search history.

(56) References Cited

U.S. PATENT DOCUMENTS

| | | | | |
|---|---|---|---|---|
| 3,730,643 | A * | 5/1973 | Davison | 416/8 |
| 4,088,352 | A * | 5/1978 | Kling | 290/55 |
| 4,118,637 | A * | 10/1978 | Tackett | 290/55 |
| 4,527,950 | A * | 7/1985 | Biscomb | 416/117 |
| 4,589,344 | A * | 5/1986 | Davison | 104/24 |
| 4,649,284 | A * | 3/1987 | Hsech-Pen | 290/55 |
| 4,832,569 | A * | 5/1989 | Samuelsen et al. | 416/17 |
| 6,217,284 | B1 * | 4/2001 | Lawrence | 416/83 |
| 6,672,522 | B1 * | 1/2004 | Lee et al. | 290/55 |
| 6,825,574 | B1 * | 11/2004 | Mooring | 290/1 R |
| 6,956,300 | B1 * | 10/2005 | Gizara | 290/43 |

* cited by examiner

*Primary Examiner*—Julio Gonzalez
(74) *Attorney, Agent, or Firm*—Charles C. Logan, II

(57) ABSTRACT

An electricity generation system having the ability to generate clean electrical power by mechanically capturing the power of the wind. The system utilizes one or more modular wind collecting sail assemblies that are mounted on an upright oriented pole assembly. The bottom end of the pole assembly is rigidly connected to a horizontally oriented elongated spring-motor primary winding axle who's opposite ends are journaled in a base assembly. Each end of the spring-motor primary winding axle is connected to a one way sprague coupling. That coupling is in turn connected to the spring-motor secondary winding axle having one or more spring motors mounted thereon. The inner end of each spring motor metal band is secured to the spring-motor secondary winding axle. When the wind force bends the wind collecting sail assembly from its static upright position, the spring-motor primary winding axle will be rotated causing the spring motors to be wound incrementally each time the wind blows the sail from its static upright position. The spring motor housing is releasably connected to a stationary retention member to prevent rotation of the spring motor housing until the spring motors are wound a sufficient amount. An electricity generator is mounted on the base assembly and there is rotation transmission structure connected to the power generation drive shaft of the electricity generator. When the spring motor assembly has been sufficiently wound, a timing gear assembly releases the motor spring housing assembly allowing it to rotate freely to dissipate stored energy and drive the electricity generator. This cycle is repeated throughout the day to generate electricity when the wind is blowing.

20 Claims, 5 Drawing Sheets

WIND POWERED PENDULATING LAND SAIL ELECTRICITY GENERATION SYSTEM

BACKGROUND OF THE INVENTION

The invention relates to an electricity generation system and more specifically to one that is powered by the force of the wind.

The two major forms methods for generating electricity generation utilize water power that turns electricity producing turbines and fossil fuels that power electric power plants. Currently, fewer dams are being built for the purpose of generating hydroelectric power. The fossil fuel electric power plants continue to consume a large amount of the worlds non-replenishing resources of coal and oil. Attempts have been made to use solar energy and wind power to produce electricity from their unlimited source of natural power. Most of these systems are costly when compared to the cost of electricity produced by fossil fuels.

The common wind powered generators have propellers or blades that are rotated by the force of the wind to produce electricity. Some of these wind generators have a tower base 200 feet or higher. These wind generators have blades or propeller up to 90 feet or longer. The tower base may have a foundation in the order of 30 feet deep. Some of the wind generators can cost more than a million dollars each.

It is an object of the invention to provide a novel electricity generation system that can be powered by the cyclic force of the wind against a wind collecting sail assembly.

It is also an object of the invention to provide a novel electricity generation station that can be moved by trailer to different locations.

It is another object of the invention to provide a novel electricity generation system that can be used to generate clean electrical power at a moderate cost.

It is also an object of the invention to provide a novel electricity generation system that utilizes spring motors that are wound by using the force of the wind.

It is another object of the invention to provide a novel electricity generation system that is economical to manufacture and market.

SUMMARY OF THE INVENTION

The wind powered electricity generation system utilizes one or more stacked wind collection sail assemblies mounted on a vertically oriented upper pole assembly unit having a Y-axis. The bottom end of the upper pole assembly unit is rigidly secured at a 90-degree angle to a tubular spring-motor primary winding axle whose opposite ends are journaled in pillow block bearings. The pillow block bearings are mounted on the upper ends of laterally spaced upright beam members whose bottom ends are secured to a base plate. The base plate is mounted on a swivel assembly that may in turn be positioned on a fixed foundation or on a trailer bed. A lower pole assembly unit extends along the Y-axis from the bottom of the spring-motor primary winding axle. A counter balance weight assembly is secured to its bottom end.

The opposite ends of the spring-motor primary winding axle have a one-way sprague coupling connected thereto. These one-way sprague couplings are also connected to a spring-motor secondary winding axle that extends through the length of the spring-motor primary winding axle and out both of its opposite ends. One or more spring motor assemblies are mounted on the respective ends of the spring-motor secondary winding axle. A plurality of spring motors are located in each spring motor assembly and they are secured to the spring-motor secondary winding axle. The purpose of the one-way sprague coupling is to allow the spring-motor secondary winding axle to spin freely once the spring motors have released their energy. The spring-motor primary winding axle does not spin during the electricity generation cycle of the spring motor drum assembly because of the one-way sprague coupling. A spring drum assembly is journaled on the spring-motor secondary winding axle. A plurality of spring motor assemblies are positioned within the spring motor drum assemblies and each has a spring motor having a spring metal band whose inner end is captured by structure attached to the outer periphery of the spring-motor secondary winding axle.

In the Description of the Preferred Embodiment, the ratcheting action of the upper pole assembly unit will rotate the spring-motor primary winding axle causing the spring-motor secondary winding axle to rotate and wind the respective spring motors to approximately 95 percent of their power range. While the spring motors are being wound, the spring motor drum assembly is prevented from rotating because the centrifical activated swivel arm next to its front end is captured against a pair of shoulders on the stationary retention plate. A timing gear assembly counts the number of rotations of the spring-motor primary winding axle. It has been designed to revolve its timing gear cam 360 degrees when the spring-motor primary winding axle is rotated 20 times. When the timing gear cam has completed its 360-degree travel, it will kick the centrifical activated swivel arm upwardly, releasing the spring motor drum assembly to rotate in a counter clockwise direction and dissipate its stored energy.

There is a generator drive pulley mounted adjacently the end of each of the spring drum assemblies and they align with a pulley mounted on the power generation drive shaft of a generator mounted on the base assembly of the electricity generation station. The stored energy in the spring motors will drive a belt passing around the respective pulleys causing the generator to produce intermittent bursts of clean A/C power that can be either utilized stored in batteries or fed into an existing power grid. The flywheels in the spring motor drum assembly will cause it to continue to rotate for a period after the power in the spring motors is dissipated. During this rotation, the centrifical activated swivel arm will remain radially extended until the spring motor drum assembly comes to a stop. At that time it will automatically drop downwardly and be captured by the shoulders on the stationary retention plate and the cycle begins again.

The wind collection sail assemblies have a plurality of draw cords having their top ends connected to the top end of the sail members and their bottom ends connected to the counterbalance weight assembly. When the force on the wind collection sail assembly becomes too great, the draw cords will be activated to dump the air in the wind collection sails and allow the upper pole assembly unit to return to its static position.

A wind vane assembly is connected to the base assembly so that the electricity generation station will rotate or swivel when the direction of the wind changes to bring the wind collection sail assembly into its proper position.

The electricity generating station can also be positioned on a platform built on stilts out in the ocean or other body of water. It would function in the same manner as previously described for generating electricity.

DESCRIPTION OF THE PREFERRED EMBODIMENT

Figure 1:
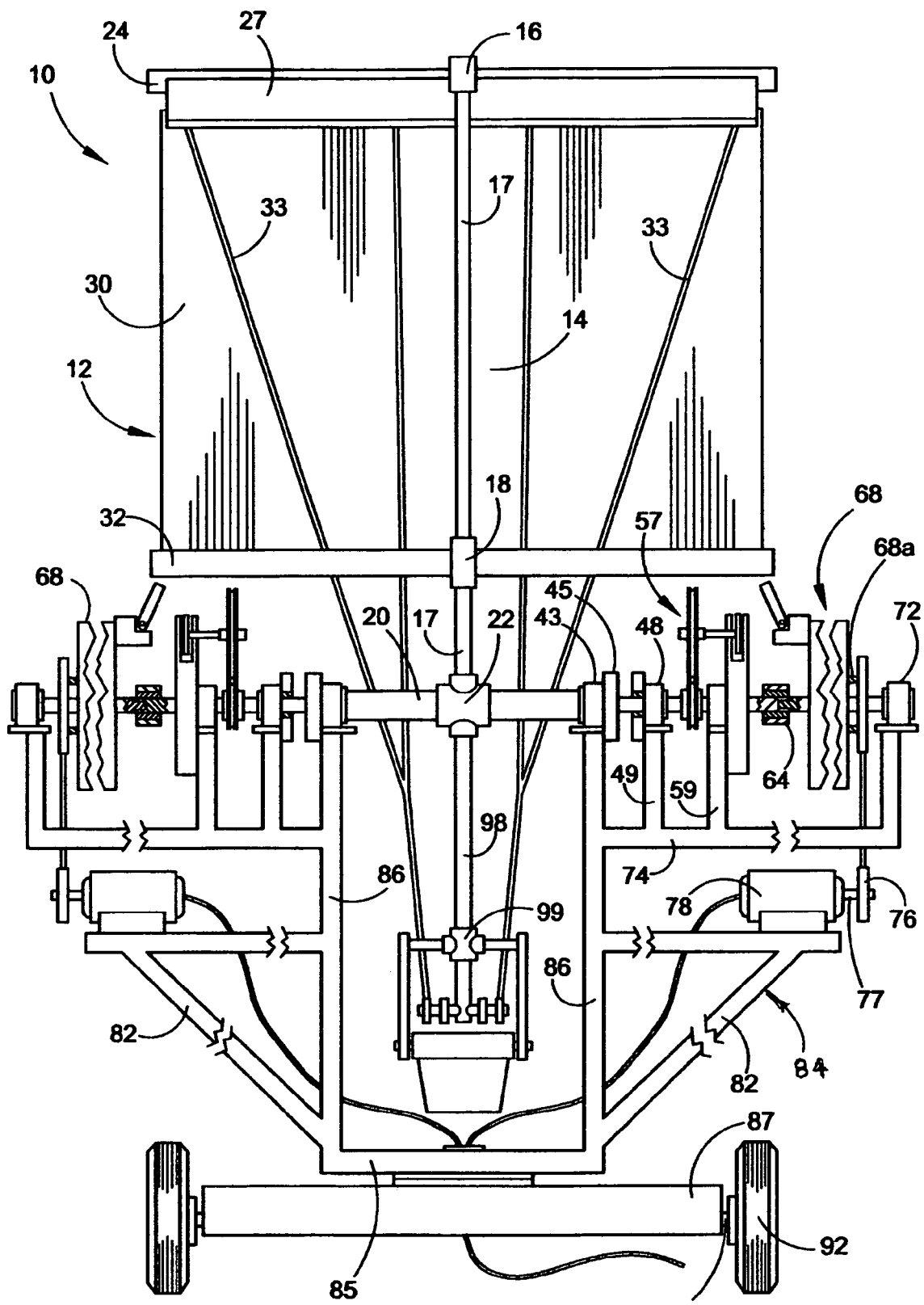
FIG. 1 is a front elevation view of the wind powered electricity generation system.
Figure 5:
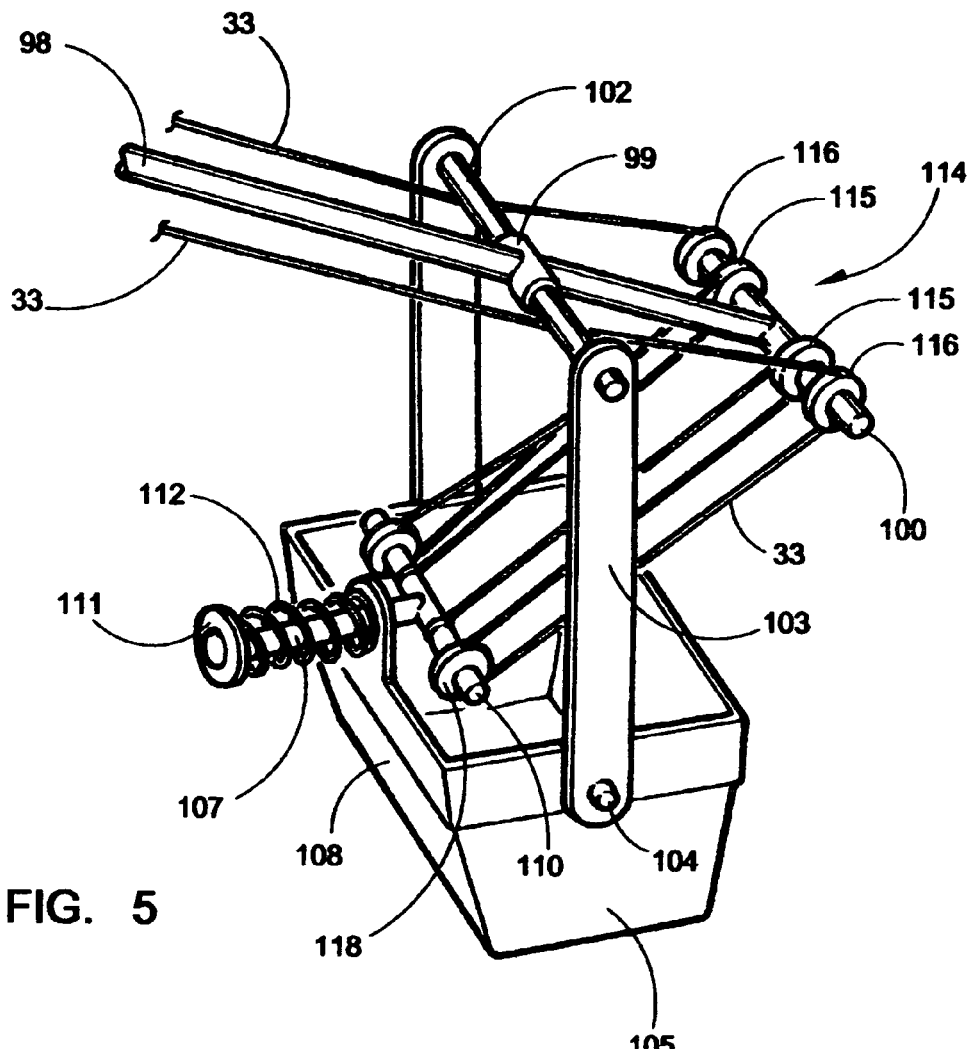
FIG. 5 is a left side perspective view of the counterbalance assembly.

The wind powered electricity generation system will now be described by referring to FIGS. 1–7 of the drawings. The portable electricity generation station 10 has at least one wind collection sail assembly 12 that is supported by an upper pole assembly unit 14. Additional wind collection said assemblies could be vertically stacked above upper coupling member 16 by extending upper pole member 17 above upper coupling member 16. Upper pole assembly unit 14 has an upper coupling member 16, an upper pole member 17, a lower coupling member 18, and a longitudinally extending Y-axis. The bottom end of upper pole assembly unit 14 is rigidly secured to spring-motor primary winding axle 20 by coupling member 22.

Figure 4:
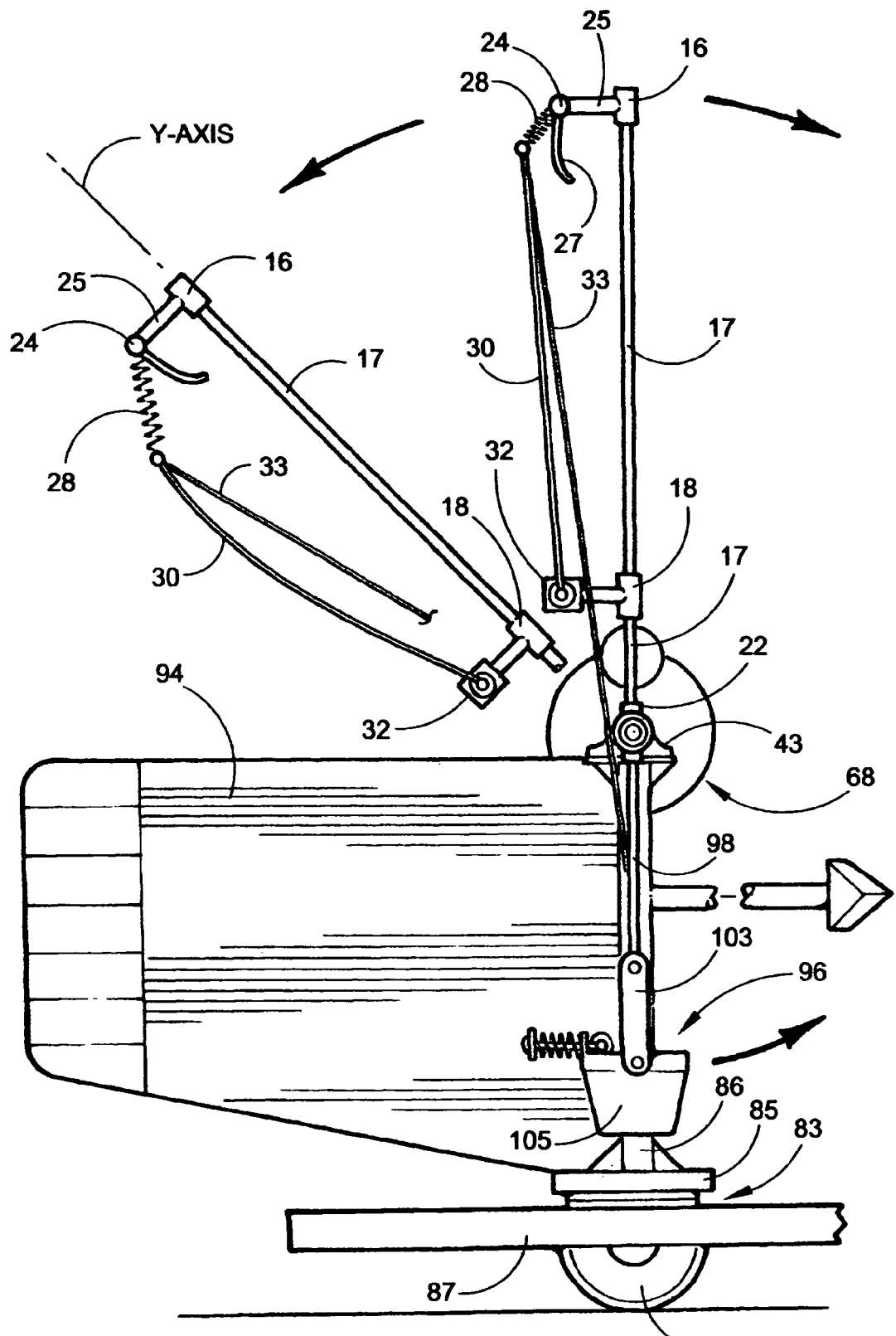
FIG. 4 is a right side elevation view showing the travel motion of the wind collection sail assembly.

Referring to FIG. 4, a support member 25 has its front end connected to upper coupling member 16 and its rear end connected to the transversely extending upper support beam 24. An elongated louver flap 27 has its top edge connected to upper support beam 24. A plurality of laterally spaced return springs 28 have their top ends attached to upper support beam 24 and their lower ends attached to wind collection sail 30. The wind collection sail 30 could be a single member or a plurality of vertical strip sail members that extend across the width of the wind collection sail assembly. The bottom end of wind collection sail 30 is attached to an automatic sail retraction unit 32. Automatic sail retraction unit 32 would function in the same manner as a window shade that automatically recoils onto itself. A plurality of laterally spaced draw cords 33 have their top ends connected to the top end of wind collection sail 30. FIG. 4 shows the wind collection sail assembly in its static vertically oriented position and a position where the wind has blown it rearwardly.

The manner in which the wind energy is collected and stored will be best understood by referring to FIGS. 1 and 4. When the wind blows against the wind collection sail assembly 12, upper pole assembly 14 will be rotated rearwardly and since its bottom end is rigidly connected to coupling member 22 it will rotate spring-motor primary winding axle 20 in a clockwise direction. Spring-motor primary winding axle 20 is delivering power to a spring motor assembly 68 on both its left side and its right side. The following discussion will only relate to delivering power to the right side, but it is to be understood that the same structure is located on the left side and it would function in a like manner.

Figure 2:
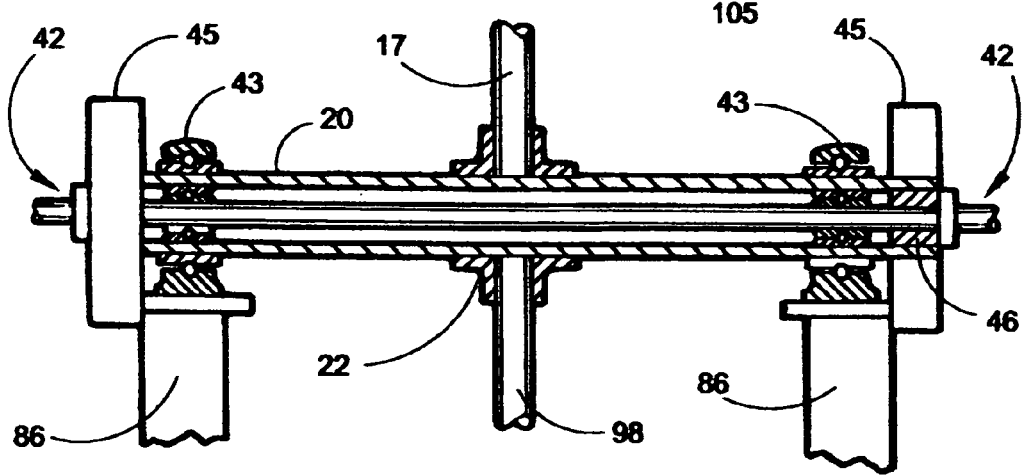
FIG. 2 is an enlarged partial front elevation view showing the spring-motor primary winding axle with portions shown in vertical cross section.
Figure 3:
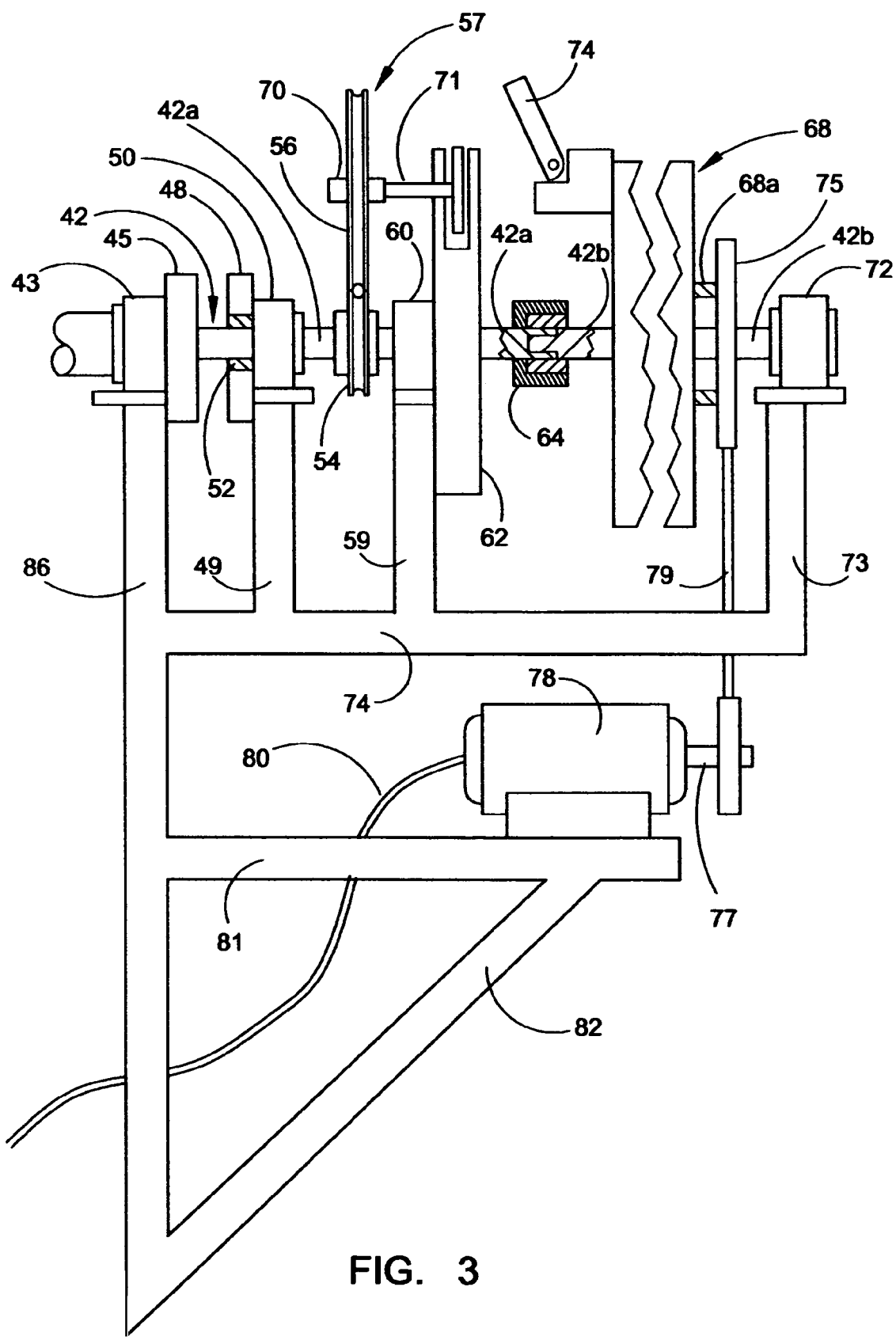
FIG. 3 is an enlarged partial front elevation view showing the spring-motor secondary winding axle with portions shown in vertical cross section.

Spring-motor primary axle 20 is tubular (see FIG. 2) and it has a spring-motor secondary winding axle 42 extending to the right. Spring-motor secondary winding axle 42 has a low speed rotation portion 42a and a high speed rotation portion 42b that will be discussed later. The right end of spring-motor primary winding axle 20 passes through a pillow block bearing 43 and it is captured in a first one-way sprague coupling 45. Referring to FIGS. 2 and 3, it will be seen that the inside diameter of the spring-motor primary winding axle 20 is rigidly secured to the outer surface sleeve 46 whose inner diameter is rigidly secured to the outer surface of spring-motor secondary winding axle 42. Therefore, clockwise rotational motion of primary axle 20 causes spring motor secondary winding axle 42 to also rotate clockwise. When the wind dies and the wind collection assembly travels back to its upright orientation, the one-way sprague coupling 45 prevents the spring-motor secondary winding axle from rotating counter clockwise. Continuing axially along spring-motor secondary winding axle 42, it next enters a second one-way sprague coupling 48 that is rigidly mounted on the top end of post 49 along with pillow block bearing 50. One-way sprague coupling 48 has a tubular clutch sleeve 52 whose inner diameter is rigidly connected to spring-motor secondary winding axle 42. The primary purpose of one-way sprague coupling 52 is to allow spring-motor winding axle 42 to have something to push off since one-way sprague coupling 52 is rigidly mounted atop post 49. Spring-motor secondary winding axle 42 rotates clockwise and winds the spring motors in spring motor assembly 68. These spring motors have a normal tendency to rotate counterclockwise when the wind stops blowing and the wind collection said assembly returns to its upright position. The spring-motor secondary winding axle needs something to keep it from rotating backwards and that is why the $2^{nd}$ one-way sprague 48 is rigidly attached to upright frame post 49 of the base assembly. Therefore spring-motor secondary winding axle 42 can only rotate in one direction.

Traveling further along the length of spring-motor secondary winding axle 42, it will now be identified as the low rotation speed portion 42a and there is a timing gear drive pulley 54 rigidly mounted thereon. It aligns with a timing actuator gear pulley 56 that is part of a timing gear assembly 57. Rotation of timing actuator gear 56 is accomplished by a closed loop belt (not shown) that passes around the respective pulleys. Low rotation speed portion 42a then passes through pillow block bearing 60 and stationary retention plate 62 that also has a bushing in its bore hole. The right end of low rotation speed portion 42a has a recess formed therein into which a ring shaped bearing is inserted. The front end of high rotation speed portion 42b has a reduced diameter nipple formed thereon that telescopically mates inside the ring shaped bearing. This connection between 42a and 42b is inside the $3^{rd}$ one-way sprague 64. The purpose of the $3^{rd}$ one-way sprague 64 is to allow the high speed rotation portion 42b to spin freely once the spring motors have released their energy. In a prototype model the high speed rotation portion rotates at approximately 400 rpm. The second purpose of the $3_{rd}$ one-way sprague 64 is to allow the low rotation speed portion 42a to rotate as in the prototype at approximately 4 rpm. If low rotation portion 42a were to spin at 400 rpms, it would tear the timing gear assembly apart and destroy it. Spring-motor primary winding axle 20 does not spin during the electricity generation cycle of the spring motor drum assembly 68 because of the 1st one-way sprague coupling 45.

For every revolution of low speed rotation portion 42a and timing gear drive pulley 54, timing actuator gear 57 will rotate 1/20 of a revolution. Timing actuator gear 57 has a bore hole in its hub 70 that receives a shaft 71 whose opposite end is rigidly secured to a timing gear cam. This timing gear cam is mounted in a slot in the top end of stationary retention plate 62. A pair of shoulders normally capture the centrifical activated swivel arm 74. This prevents rotation of spring-motor drum assembly 68. The timing gear cam rotates through its full cycle each time low speed rotation portion 42a rotates 20 times while winding each of the spring motors. The operation of the timing gear assembly is identical to that illustrated in U.S. patent application Ser. No. 10/244,169 and its structure and the manner in which it functions is incorporated herein. The structure of spring motor drum assembly 68 is the same as that illustrated in U.S. patent application Ser. No. 10/244,169 and its structure and the manner in which it functions is incorporated by reference in this patent application.

The right end of high rotation speed rotation portion 42a is journaled in pillow box bearing 72 that is mounted on post 73. Posts 49, 59 and 73 are mounted on horizontal support arm 74. A pulley 75 is mounted on high rotation speed portion 42b and a pulley 76 is mounted on drive shaft 77 of electricity generator 78. A belt 79 passes around pulleys 75 and 76. The produced electricity is transmitted through electrical conductor wire 80 to a location where the electricity may be distributed. This electricity may be put into use immediately, it may be stored in batteries, or it may be connected to a power grid for sale to a local electric power company. Electrical generator 78 is mounted on an arm 81 that is given further support by brace 82.

Base assembly 84 has a base plate 85 to which upright frame members 86 are rigidly connected. Support arms 74 and 81 are rigidly connected to upright frame members 86. Base plate 85 is mounted on a swivel assembly 83 that in turn is mounted on trailer platform 87. Electrical wires 80 pass downwardly through a bore hole 89 in the respective members. Axles 90 extend laterally from trailer platform 87 and have wheels 92 mounted thereon. It is to be understood that the base assembly 84 could also be mounted on a swivel assembly mounted on a rigid stationary concrete platform. A wind vane 94 would be rigidly secured to base assembly 84 so that the wind would properly align the wind collection sail assembly 12 to face directly into the wind as the direction of the wind changes.

Figures 6, 7:
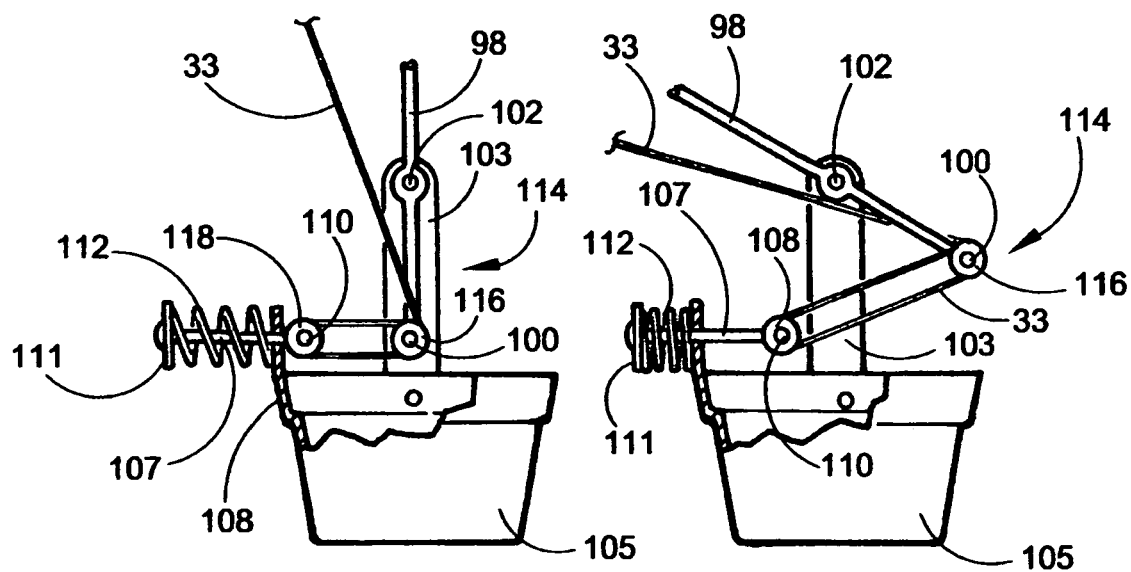
FIG. 6 is a left side elevation view of the counterbalance assembly with the pole assembly vertically oriented in its static position.
FIG. 7 is a left side elevation view of the counterbalance assembly with the pole assembly having been rotated rearwardly by the wind.

A counterbalance assembly 96 is connected to the bottom end of coupling member 22. It includes a lower pole member 98 that passes through a coupling member 99 and it has a cross member 100 secured to its bottom end. An axle 102 extends outwardly from the opposite sides of coupling member 99 and has its ends journaled in a pair of upright oriented link members 103. The bottom ends of link members 103 are journaled on shafts 104 extending outwardly from counterbalance weight bucket 105. This bucket would be filled with a sufficient weight of ballast to keep the wind collection sail assembly 12 vertically oriented in its static state. A rod member 107 passes freely through an aperture in rear wall 108 and has its front end rigidly secured to cross member 110. The other end of rod member 107 has a plate 111 that captures a helical spring 112 between it and rear wall 108. Draw cords 33 have their bottom ends secured to a bleeder assembly unit 114 that functions to dump air from the wind collection sail assembly 12 when it has been rotated rearwardly a predetermined number of degrees. Bleeder assembly unit 114 has a plurality of pulleys 115 and 116 mounted on cross member 100 and an additional pulley 118 mounted on cross member 110. The bottom end of draw cords 33 in sequence pass around pulley 115, pulley 118 and pulley 116 and have their bottom ends secured to cross member 110. FIG. 6 illustrates the pole member 98 in its vertically oriented static position. At this position, spring 112 keeps cross member 110 secured against rear wall member 108 of counterbalance weight bucket 105. As the force of the wind against the wind collection sail assembly increases, the lower end of pole member 98 rotates forwardly and upwardly pulling cross member 100 therewith. When the wind reaches a predetermined force, it will completely compress spring 112 (see FIG. 7) and provide a sufficient pulling force against the bottom end of draw cords 33 to extend the return springs 28 downwardly from louver member 27. This produces a passage through which air is allowed to escape from the top end of the respective sail members 30. When the force of the wind lessens or stops, return springs 28 will pull the wind collection sails 30 upwardly to their static position as upper pole member 17 is brought to its vertical position.

Figure 8:
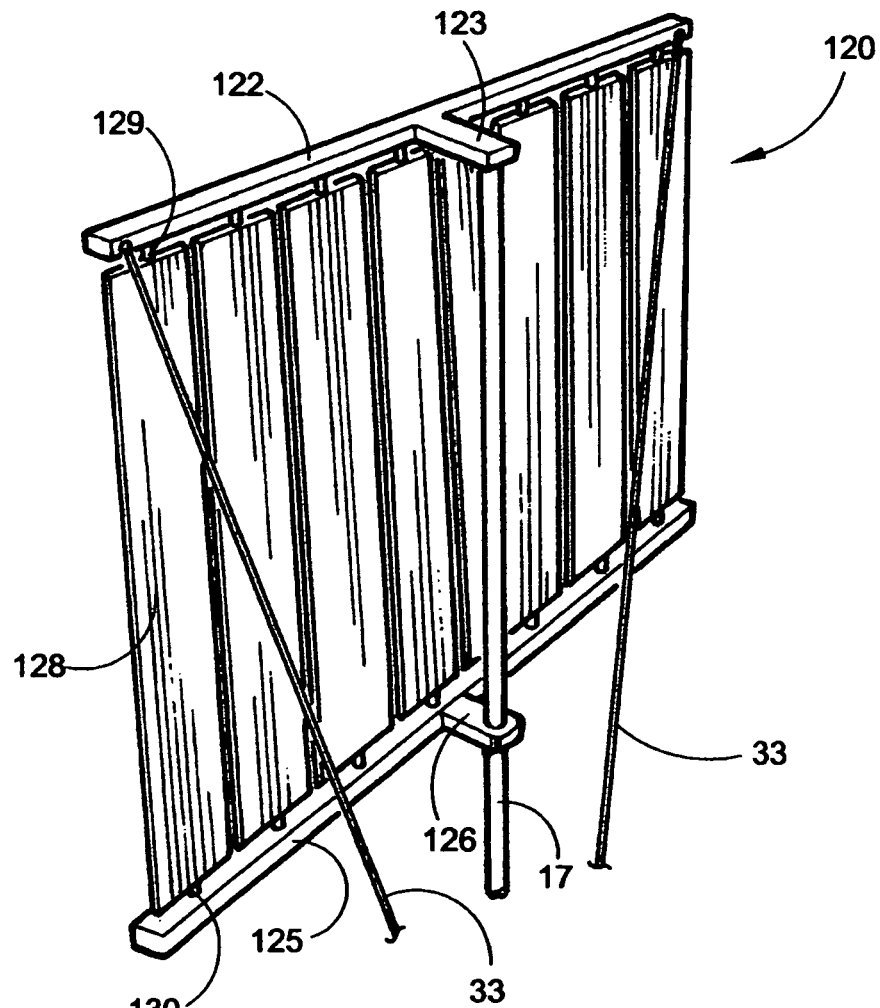
FIG. 8 is a front perspective view of a first alternative embodiment of the wind collection sail assembly.

An alternative embodiment wind collection sail assembly 120 is illustrated in FIG. 8. It is mounted on the upper end of pole member 17. It has an upper transverse support member 122 that is connected by a support member 123 to the upper end of pole member 17. A lower transverse support member 125 is connected by a support member 126 to pole member 17. A plurality of vertically oriented louvers or vanes 128 have pins 129 and 130 extending from their respective top and bottom ends. These pins would be connected to gears or other structure associated with cross member 122 that would be actuated by draw cords 33 as the wind collection sail assembly 120 is rotated rearwardly to a predetermined angle. The manner previously discussed for dumping the air in the wind collection sail assembly 12 would function in the same manner to rotate the louvers or vanes 128 about their respective pins and allow air against them to be dumped.

What is claimed is:

1. A wind powered electricity generation system comprising:

a base assembly having a base member having a top surface and a bottom surface; a pair of laterally spaced left and right upright beam members each having a top end and a bottom end and said bottom ends being rigidly connected to said top surface of said base member;

a horizontally oriented elongated spring-motor primary winding axle having a left end, a right end and a longitudinally extended X-axis; said left end being journaled in a first bearing means secured to said left upright beam member and said right end being journaled in a second bearing means secured to said right upright beam member so that said spring-motor primary winding axles can reciprocally rotate about said X-axis;

a wind collection sail assembly having a top end, a bottom end and at least one upright oriented wind collection sail;

primary support means connecting said wind collection sail assembly to said spring-motor primary winding axle so that when a wind force blows against said wind collection sail assembly said spring-motor primary winding axle will be rotated in a first direction and when the force of the wind lessens or stops, said spring-motor drive shaft will reciprocally rotate in an opposite second direction;

a first spring motor assembly having a spring-motor secondary winding axle; at least one spring-motor mounted on said spring-motor secondary winding axle for rotating said spring-motor secondary winding axle;

a first electricity generator having a first driven shaft;

a first drive means for taking rotational force from said first spring motor assembly and rotating said first driven shaft of said first electricity generator to produce electricity; and first one-way transmission means connected between said right end of said spring-motor primary winding axle and said spring-motor secondary winding axle that winds said spring motors when the wind blows against said wind collection sail assembly and prevents said spring-motor secondary winding axle from rotating backwardly when the force of the wind lessens or stops and said spring-motor primary winding axle reciprocally rotates in an opposite direction.

2. A wind powered electricity generation system as recited in claim 1 further comprising a swivel assembly positioned under said base assembly for rotating said wind collecting sail assembly to face the wind.

3. A wind powered electricity generation system as recited in claim 2 further comprising tracking means for automatically rotating said wind collection sail assembly to face the wind.

4. A wind powered electricity generation system as recited in claim 3 wherein said tracking means comprises a wind vane structure connected to said base assembly.

5. A wind powered electricity generation system as recited in claim 1 wherein said base assembly is mounted on a transportable trailer unit.

6. A wind powered electricity generation system as recited in claim 1 further comprising counterbalancing means for returning said wind collection sails to an upright position when the force of the wind lessens and stops.

7. A wind powered electricity generation system as recited in claim 6 wherein said counterbalancing means comprises an elongated lower pole assembly having a top end, a bottom end, said top end being rigidly connected to said spring-motor primary winding axle.

8. A wind powered electricity generation system as recited in claim 7 wherein said counterbalancing means further comprises a counterweight balance bucket attached to said lower end of said lower pole assembly.

9. A wind powered electricity generation system as recited in claim 1 wherein said primary support means comprises an upright oriented upper pole assembly having a top end, a bottom end and an elongated Y-axis.

10. A wind powered electricity generation system as recited in claim 9 wherein said primary support means further comprises a transversely extending upper support beam that is connected to said top end of said upper pole assembly and first attachment means for attaching said top end of said wind collection sail to said upper support beam.

11. A wind powered electricity generation system as recited in claim 10 wherein said attachment means comprises a plurality of return springs laterally spaced across the length of said upper support beam.

12. A wind powered electricity generation system as recited in claim 11 further comprising a transversely extending automatic sail retraction unit into which said bottom end of said wind collection sail is received and captured; and second attachment means for attaching said automatic sail retraction unit adjacent said bottom end of said upper pole assembly.

13. A wind powered electricity generation system as recited in claim 12 further comprising a transversely extending louver member connected to said first attachment means for deflecting away the wind adjacent said top end of said wind collection unit.

14. A wind powered electricity generation system as recited in claim 7 further comprising air dumping means for dumping air from said wind collection sail assembly when the wind has reached a predetermined critical force.

15. A wind powered electricity generation system as recited in claim 7 wherein said air dumping means comprises a plurality of laterally spaced elongated draw cords each having a top end and a bottom end; said top ends being attached adjacent said top end of said wind collection sail; said bottom ends being connected adjacent said bottom end of said lower pole assembly.

16. A wind powered electricity generation system as recited in claim 1 further comprising a second spring motor assembly having a spring-motor secondary winding axle; at least one spring motor mounted on said spring-motor secondary winding axle for rotating said spring-motor secondary winding axle; a second electricity generator having a first driven shaft; a second drive means for taking rotational force from said second spring motor assembly and rotating said first driven shaft of said second electricity generator to produce electricity and a second one-way transmission means connected between said left end of said primary winding axle and said second spring-motor secondary winding axle that winds said spring motors when the wind blows against said wind collection sail assembly and prevents said second spring-motor secondary winding axle from rotating backwardly when the force of wind lessens or stops and said spring-motor primary winding axle reciprocally rotates in an opposite direction.

17. A wind powered electricity generation system as recited in claim 16 wherein said spring-motor primary winding axle is tubular and said first and second spring-motor secondary winding axles are a unitary member that passes through said tubular spring-motor primary winding axle.

18. A wind powered electricity generation system as recited in claim 1 wherein said first one-way transmission means is a one-way sprague coupling.

19. A wind powered electricity generation system as recited in claim 1 further comprising counting means for keeping track of the number of times said at least one spring motor is wound a predetermined number of rotations.

20. A wind powered electricity generation system as recited in claim 19 further comprising unlatching means for releasing said spring motors after they have been wound a predetermined number of rotations, so that they can power said electricity generator.

* * * * *